United States Patent [19]

Matsuda et al.

[11] Patent Number: 5,861,771
[45] Date of Patent: Jan. 19, 1999

[54] REGULATOR CIRCUIT AND SEMICONDUCTOR INTEGRATED CIRCUIT DEVICE HAVING THE SAME

[75] Inventors: Atsushi Matsuda; Hirokazu Tanaka; Kunihiko Gotoh, all of Kawasaki, Japan

[73] Assignee: Fujitsu Limited, Kanagawa, Japan

[21] Appl. No.: 871,954

[22] Filed: Jun. 10, 1997

[30] Foreign Application Priority Data

Oct. 28, 1996 [JP] Japan ..................................... 8-285647

[51] Int. Cl.$^6$ .......................................................... G05F 3/16
[52] U.S. Cl. .......................... 327/540; 327/541; 327/543; 323/513; 323/515; 323/516
[58] Field of Search ..................... 323/513, 516, 323/515; 327/540, 541, 543

[56] References Cited

U.S. PATENT DOCUMENTS

| | | | |
|---|---|---|---|
| 5,077,518 | 12/1991 | Han | 323/275 |
| 5,103,158 | 4/1992 | Cho et al. | 323/314 |
| 5,373,226 | 12/1994 | Kimura | 323/313 |
| 5,442,314 | 8/1995 | Hara | 327/543 |
| 5,546,042 | 8/1996 | Tedrow et al. | 327/538 |
| 5,731,735 | 3/1998 | Yokota et al. | 327/535 |

*Primary Examiner*—Timothy P. Callahan
*Assistant Examiner*—An T. Luu
*Attorney, Agent, or Firm*—Nikaido Marmelstein Murray & Oram LLP

[57] ABSTRACT

A regulator circuit includes an output circuit outputting an output voltage based on a control voltage, a reference voltage generating circuit generating a reference voltage, an output voltage control circuit comparing the reference voltage with a voltage depending on the output voltage and producing the control voltage based on a comparison result, and a power supply circuit which supplies the reference voltage generating circuit and the output voltage control circuit with a first power supply voltage which is different from a second power supply voltage supplied to the output circuit.

24 Claims, 9 Drawing Sheets

FIG. 9

REGULATOR CIRCUIT AND SEMICONDUCTOR INTEGRATED CIRCUIT DEVICE HAVING THE SAME

BACKGROUND OF THE INVENTION

1. Field of the Invention

The present invention relates to a regulator circuit which steps down a given power supply voltage and supplies a resultant decreased voltage to a circuit. More particularly, the present invention is concerned with a regulator circuit which is integrated, on a chip, with a circuit to be supplied with the voltage output by the regulator circuit.

2. Description of the Related Art

Figure 1:
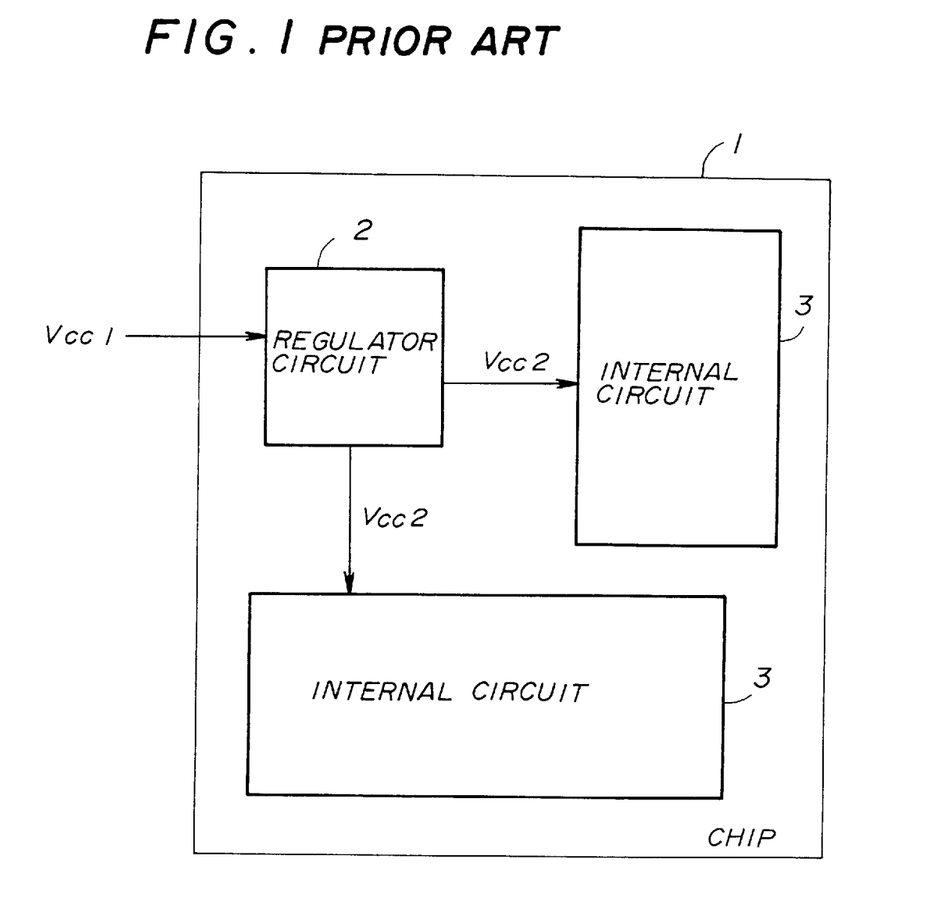
FIG. 1 is a block diagram of a conventional semiconductor integrated circuit device having a chip on which a regulator circuit and internal circuits are integrally formed.

FIG. 1 is a diagram of a conventional semiconductor integrated circuit in which a regulator circuit 2 and internal circuits 3 are integrally formed on a chip 1. An external power supply voltage Vcc1 is supplied to the regulator circuit 2 formed on the chip 1. The regulator circuit 2 steps down the external power supply voltage and produces a given internal power supply voltage Vcc2, which is supplied to the internal circuits 3.

The regulator circuit 2 is required in a situation in which the internal circuits 3 are formed of fine elements such as MOS transistors while a system to which the chip 1 is connected employs the power supply voltage Vcc1 higher than the Vcc2. For example, the external power supply voltage Vcc1 is equal to 5 V, and the internal power supply voltage Vcc2 is equal to 3.3 V.

Figure 2:
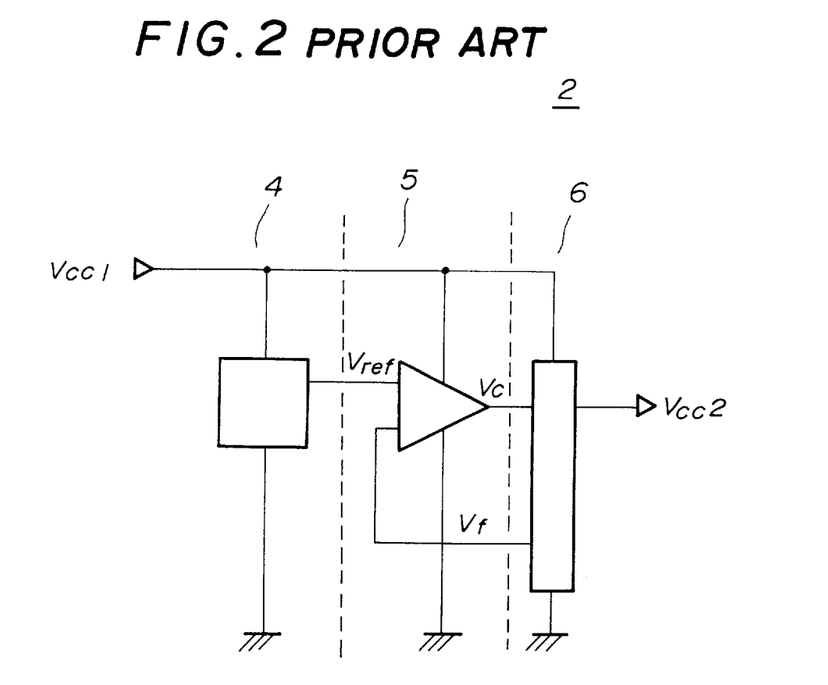
FIG. 2 is a block diagram of the regulator circuit shown in FIG. 1.

FIG. 2 is a block diagram of the regulator circuit 2, which is made up of a reference voltage generating circuit 4, an output voltage control circuit 5 and an output circuit 6. The output voltage control circuit 5 compares a reference voltage Vref generated by the reference voltage generating circuit 4 with a fed-back voltage Vf from the output circuit 6, and outputs a resultant control signal Vc to the output circuit 6. Hence, the output circuit 6 is caused to maintain the internal power supply voltage Vcc2 at a constant level. It should be noted that all of the circuits 4, 5 and 6 are driven by the external power supply voltage Vcc1.

The regulator circuit 2 has the following disadvantages. As described above, the external power supply voltage Vcc1 is higher than the internal power supply voltage Vcc2 applied to the internal circuits 3. Hence, it is required that the elements forming the circuits 4 through 6, such as MOS transistors, have a size greater than that of the elements forming the internal circuits 3. More particularly, it is required that the MOS transistors used for the circuits 4 through 6 have an increased breakdown voltage. For this requirement, the MOS transistors are designed to have an increased gate length and increased source/drain regions. Thus, the regulator circuit made up of the circuits 4 through 6 occupies a large area on the chip 1, and the integration density of the chip 1 is reduced. If an available area on the chip 1 is not sufficiently obtained, it will be necessary to increase the size of the chip 1.

There is a case where the internal circuits 3 have a function which requires a certain reference voltage. In such a case, the reference voltage Vref generated by the reference voltage generating circuit 4 of the regular circuit 2 can be used as the reference voltage of the internal circuits 3. Hence, the reference voltage generating circuit 4 can be commonly owned by the regulator circuit 2 and the internal circuits 3.

However, the reference voltage Vref generated by the reference voltage generating circuit 4 may transiently reach the external power supply voltage Vcc1 because the reference voltage generating circuit 4 is driven by the external power supply voltage Vcc1. In this case, if the external power supply voltage Vcc1 is applied to the internal circuits 3 as the reference voltage Vref, the internal circuits 3 may be destroyed. Hence, in practice, it is necessary to provide, separately from the reference voltage generating circuit 4, another reference voltage generating circuit specifically applied to the internal circuits 3. However, the additional reference voltage generating circuit reduces the available area on the chip 1.

SUMMARY OF THE INVENTION

It is a general object of the present invention to provide a regulator circuit and a semiconductor integrated circuit device having the same in which the above disadvantages are eliminated.

A more specific object of the present invention is to provide a regulator circuit which can be formed by elements having a reduced breakdown voltage so that the regulator circuit occupies a reduced area on a chip and which can generate a regulated voltage usable as a reference voltage for an internal circuit integrally provided on the chip together with the regulator circuit.

The above objects of the present invention are achieved by a regulator circuit comprising: an output circuit outputting an output voltage based on a control voltage; a reference voltage generating circuit generating a reference voltage; an output voltage control circuit comparing the reference voltage with a voltage depending on the output voltage and producing the control voltage based on a comparison result; and a power supply circuit which supplies the reference voltage generating circuit and the output voltage control circuit with a first power supply voltage which is different from a second power supply voltage supplied to the output circuit. Thus, the reference voltage generating circuit and the output voltage control circuit can be driven by the first power supply voltage which is different from the second power supply voltage applied to the output circuit. The first power supply voltage can be lower than the second power supply voltage. Hence, the reference voltage generating circuit and the output voltage control circuit can be made by elements having a reduced size and a reduced breakdown voltage. Further, the reference voltage generated by the reference voltage generating circuit can be used to drive an internal circuit because the first power supply voltage is lower than the second (external) power supply voltage.

The regulator circuit may be configured so that the power supply circuit comprises a voltage step-down circuit which steps down the second power supply voltage and thus generates the first power supply voltage. The first power supply voltage supplied to the reference voltage generating circuit 4 and the output voltage control circuit 5 can be generated within the regulator circuit.

The regulator circuit may be configured so that: the power supply circuit comprises a voltage step-down circuit which steps down the second power supply voltage and thus generates the first power supply voltage; and the voltage step-down circuit comprises a voltage dividing circuit which divides the second power supply voltage to thereby generate the first power supply voltage. The first power supply voltage supplied to the reference voltage generating circuit and the output voltage control circuit can be generated within the regulator circuit and there is no need to externally supply these circuits with the first power supply voltage.

The regulator circuit may be configured so that the voltage dividing circuit comprises resistors connected in series between the second power supply voltage and a given node. The first power supply voltage supplied to the reference voltage generating circuit and the output voltage control circuit can be generated within the regulator circuit by a simple circuit configuration.

The regulator circuit may be configured so that: the power supply circuit comprises a voltage step-down circuit which steps down the second power supply voltage and thus generates the first power supply voltage; and the voltage step-down circuit comprises a transistor connected in a source-follower formation, and has a drain receiving the second power supply circuit, a gate receiving a given voltage lower than the second power supply voltage, and a source via which the first power supply voltage is output. With this arrangement, the first power supply voltage is not affected by a variation in the second power supply voltage. Hence, this arrangement is suitable for an application in which a variation in the load of the reference voltage generating circuit or the output voltage control circuit is not negligible or the reference voltage is used as a reference voltage of an internal circuit requiring a high precision.

The regulator circuit may be configured so that: the power supply circuit comprises a voltage step-down circuit which steps down the second power supply voltage and thus generates the first power supply voltage; and the voltage step-down circuit comprises the voltage step-down circuit comprises at least one diode provided between the second power supply voltage and a given node having a potential lower than the second power supply voltage, the first power supply voltage corresponding to a level shifted voltage generated by the above at least one diode. With this arrangement, the first power supply voltage is not affected by a variation in the second power supply voltage. Hence, this arrangement is suitable for an application in which a variation in the load of the reference voltage generating circuit or the output voltage control circuit is not negligible or the reference voltage is used as a reference voltage of an internal circuit requiring a high precision.

The regulator circuit may be configured so that: the power supply circuit comprises a voltage step-down circuit which steps down the second power supply voltage and thus generates the first power supply voltage; and a switch circuit which selects one of the first power supply voltage generated by the voltage step-down circuit and the output voltage output by the output circuit. Hence, the output voltage can be continuously and stably output irrespective of whether the second power supply voltage is varied. More particularly, at the time of power on, the first power supply voltage is applied to the reference voltage generating circuit and the output voltage control circuit until the output voltage output by the output circuit is settled. Then, the stabled output voltage is applied to these circuits instead of the first power supply voltage.

The regulator circuit may be configured so that the power supply circuit comprises a control circuit which controls the switch circuit on the basis of the output voltage output by the output circuit. Hence, it is possible to automatically regulate the output voltage immediately after power on.

The regulator circuit may be configured so that the switch circuit selects the first power supply voltage when the second power supply voltage starts being externally supplied, and selects the output voltage when the output voltage is settled. Hence, it is possible to automatically regulate the output voltage immediately after power on.

The regulator circuit may be configured so that the control circuit comprises a transistor having a gate receiving the output voltage, a first terminal coupled to the second power supply voltage, and a second terminal coupled to a given potential, a voltage of the first terminal of the transistor being used to control the switch circuit. Hence, it is possible to automatically regulate the output voltage immediately after power on.

The regulator circuit may be configured so that the control circuit comprises an inverter circuit which inverts the voltage of the first terminal of the transistor, an inverted voltage being applied to the switch circuit in order to control the switch circuit.

Another object of the present invention is to provide a semiconductor integrated circuit device having a regulator circuit as described above.

The above object of the present invention are also achieved by a semiconductor integrated circuit device comprising: a chip; a voltage regulator; and an internal circuit supplied with an output voltage by the voltage regulator. The voltage regulator comprises: an output circuit outputting said output voltage based on a control voltage; a reference voltage generating circuit generating a reference voltage; an output voltage control circuit comparing the reference voltage with a voltage depending on the output voltage and producing the control voltage based on a comparison result; and a power supply circuit which supplies the reference voltage generating circuit and the output voltage control circuit with a first power supply voltage which is different from a second power supply voltage supplied to the output circuit.

The voltage regulator may be configured as described above.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Figure 3:
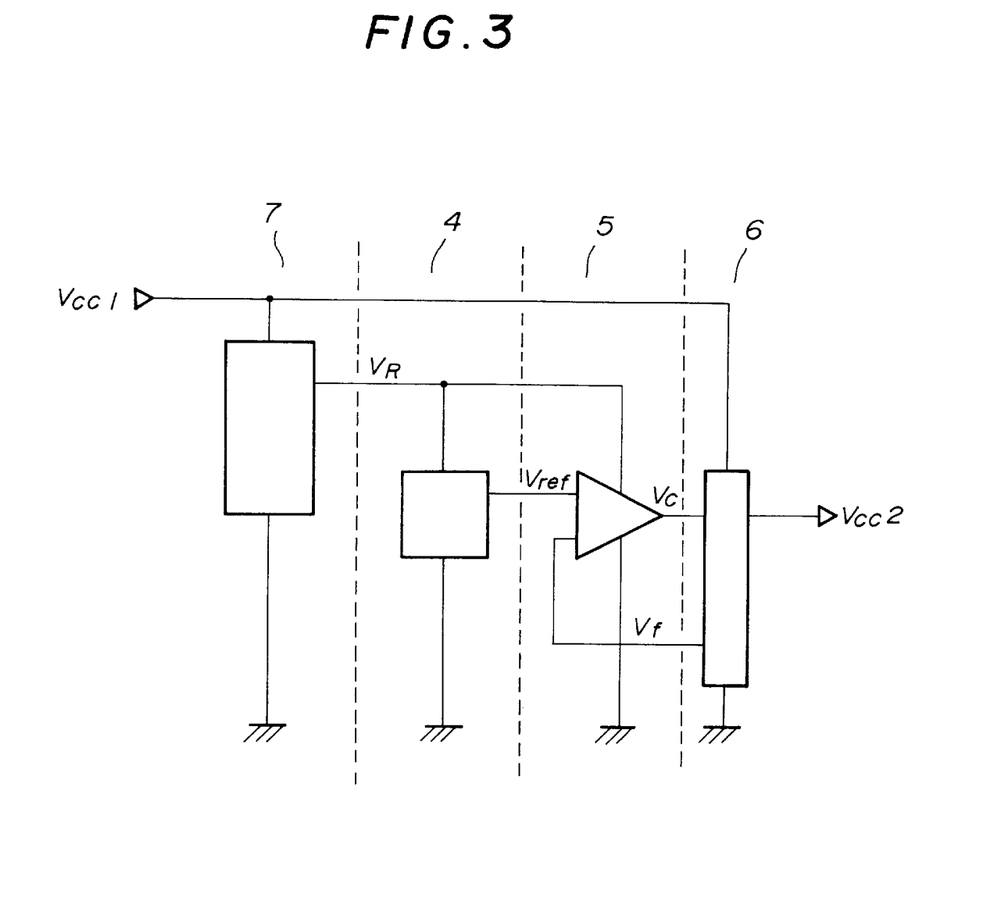
FIG. 3 is a block diagram of a regulator circuit according to the present invention.

FIG. 3 is a block diagram of a regulator circuit according to the present invention, in which parts that are the same as those shown in the previously described figures are given the same reference numbers. The regulator circuit shown in FIG. 3 includes a voltage step-down circuit 7, which receives the external power supply voltage Vcc1 and produces a step-down voltage $V_R$ therefrom. The reference voltage generating circuit 4 and the output voltage control circuit 5 are driven by the step-down voltage $V_R$. Only the output circuit 6 of the final stage of the regulator circuit is driven by the external power supply voltage Vcc1.

It is not necessary to drive the reference voltage generating circuit 4 and the output voltage control circuit 5 by the external power supply voltage Vcc1 because the circuit 4 is required to generate the given reference voltage Vref and the circuit 5 is required to output the given control signal Vc. The voltages Vref and Vc can be produced from a voltage lower than the external power supply voltage Vcc1. In practice, the reference voltage generating circuit 4 and the output voltage control circuit 5 can be formed of operational amplifiers, which are not liable to be affected by a variation in the power supply voltage. With the above in mind, the voltage step-down circuit 7, which can be configured in a simple fashion, is provided to drive the circuits 4 and 5.

Hence, the circuits 4 and 5 can be formed by reduced-size elements having a reduced breakdown voltage. Hence, the area of the regulator circuit on the chip can be reduced and the chip area can be reduced.

In the configuration shown in FIG. 3, the reference voltage Vref generated by the reference voltage generating circuit 4 does not become equal to the external power supply voltage Vcc1 even in a transient time. Hence, the reference voltage generated by the reference voltage generating circuit 4 can be used as a reference voltage for the internal circuits 3. Hence, it is not necessary to provide another reference voltage generating circuit specifically directed to the internal circuits 3 separately from the reference voltage generating circuit 4. As a result, the chip area can be drastically reduced.

The value of the step-down voltage $V_R$ is selected so that it can normally drive the reference voltage generating circuit 4 and the output voltage control circuit 5. In this regard, the step-down voltage $V_R$ can be any value within a voltage range in which the circuits 4 and 5 can be normally driven. If the step-down voltage $V_R$ has a value equal to that of the internal power supply voltage Vcc2 supplied to the internal circuits 3, the circuits 4 and 5 can be formed by elements such as MOS transistors having a size equal to that of elements forming the internal circuits 3.

The regulator circuit shown in FIG. 2 has the following voltage regulating function. The output voltage control circuit 5 compares the reference voltage Vref generated by the circuit 4 with the fed-back voltage Vf from the circuit 6, and outputs the resultant control signal Vc to the circuit 6. Hence, the internal power supply voltage Vcc2 can be maintained at a given fixed level.

Figure 4:
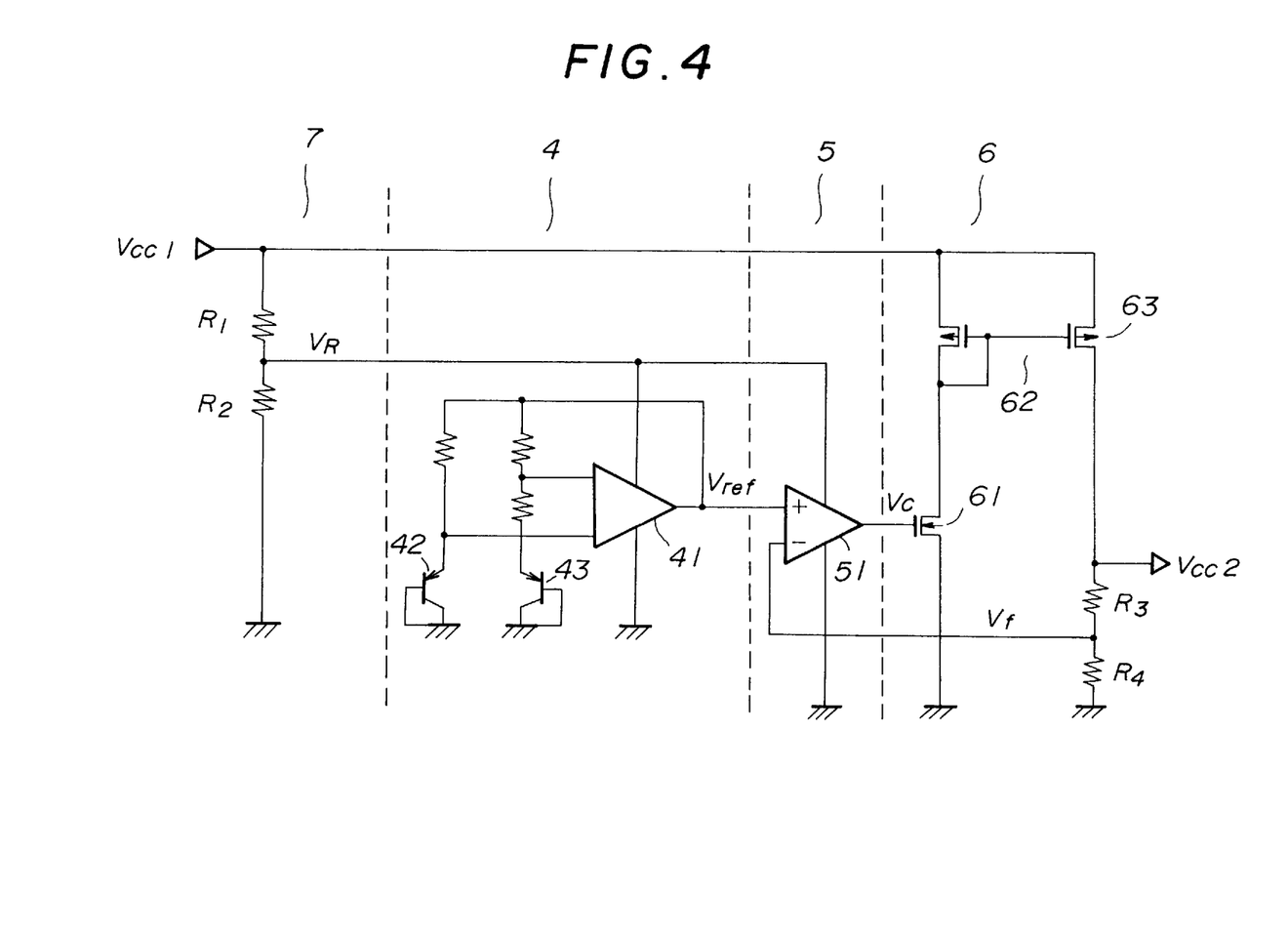
FIG. 4 is a circuit diagram of a regulator circuit according to a first embodiment of the present invention.

FIG. 4 is a circuit diagram of a voltage regulator according to a first embodiment of the present invention. In FIG. 4, parts that are the same as those shown in the previously described figures are given the same reference numbers. The voltage step-down circuit 7 includes resistors R1 and R2, which form a series circuit connected between the external power supply line Vcc1 and the ground. The series circuit functions as a voltage dividing circuit, which divides the external power supply voltage Vcc1 by the resistors R1 and R2. The step-down voltage $V_R$ which is lower than the external power supply voltage Vcc1 can be obtained at a connection node at which the resistors R1 and R2 are connected in series. The step-down voltage $V_R$ can be set equal to a desired value lower than Vcc1 (lower than, for example, 5 V) by adjusting the ratio between the resistance values of the resistors R1 and R2. The step-down voltage $V_R$ is supplied to the reference voltage generating circuit 4 and the output voltage control circuit 5, and drives these circuits.

It should be noted that the voltage step-down circuit 7 is formed of a simple voltage dividing circuit. If the external power supply voltage Vcc1 is varied or the magnitude of a load supplied with the step-down voltage $V_R$ is varied, the step-down voltage $V_R$ will be varied. However, the step-down voltage $V_R$ is applied to only the reference voltage generating circuit 4 and the output voltage control circuit 5, these circuits being formed by operational amplifiers in practice. Hence, there is a very small variation in the load to which the step-down voltage $V_R$ is applied, and there is thus a very small variation in the step-down voltage $V_R$. Further, the operational amplifiers forming the circuits 4 and 5 are not liable to be affected by a variation in the step-down voltage $V_R$ due to an external factor. Hence, it is possible to simply form the voltage step-down circuit 7 by the resistors R1 and R2.

The reference voltage generating circuit 4 is formed of a so-called a band gap reference circuit (hereinafter simply referred to as a BGR circuit). The BGR circuit utilizes a fine difference between the base-emitter voltage $V_{BE}$ of a transistor 42 and the base-emitter voltage $V_{BE}$ of a transistor 43, and cancels a variation in the reference voltage Vref caused by a temperature variation. An operational amplifier 41 to which the transistors 42 and 43 are connected is driven by the step-down voltage $V_R$ lower than the external power supply voltage Vcc1. Hence, the operational amplifier 41 can be formed by elements having a reduced breakdown voltage and a reduced size.

The output voltage control circuit 5 includes an operational amplifier 51, which compares the reference voltage Vref generated by the reference voltage generating circuit 4 with the fed-back voltage Vf from the output circuit 6, and outputs the control signal Vc depending on the comparing result. The operational amplifier 51 is driven by the step-down voltage $V_R$ lower than the external power supply voltage Vcc1, and can be thus formed by elements having a reduced size and a reduced breakdown voltage.

The output circuit 6 includes an input MOS transistor 61, which is driven by the control signal Vc from the output voltage control circuit 5. A current-mirror circuit 62 made up of two MOS transistors including an output transistor 63 receives the drain current of the transistor 61 dependent on the control signal Vc, and causes a current having the same amount as that of the drain current to flow in the output transistor 63. The current flowing in the output transistor 63 flows in a series circuit of resistors R3 and R4. The internal power supply voltage Vcc2 is obtained at an end of the series circuit (an end of the resistor R3). A voltage obtained at a connection node at which the resistors R3 and R4 are connected in series functions as the reference voltage Vf to be fed back to the operational amplifier 51.

The internal power supply voltage Vcc2 can be maintained at a fixed level by the following circuit function. If the internal power supply voltage Vcc2 is increased due to a certain factor, the fed-back voltage Vf is increased. The increased fed-back voltage Vf is applied to the inverting input terminal of the operational amplifier 51, which reduces the control voltage Vc. The reduced control voltage Vc reduces the drain current of the input transistor 61. The reduced drain current reduces the drain current of the output transistor 63. Since the current flowing in the resistors R3 and R4 is reduced, the internal power supply voltage Vcc2 is reduced. Hence, an increase in the power supply voltage Vcc2 can be canceled.

According to the first embodiment of the present invention, by providing the voltage step-down circuit 7 having a simple structure of the resistors R3 and R4, it is possible to form the circuits 4 and 5 by elements having a reduced size and a reduced breakdown voltage and to reduce the corresponding area occupied on the chip and/or reduce the chip size.

Figure 5:
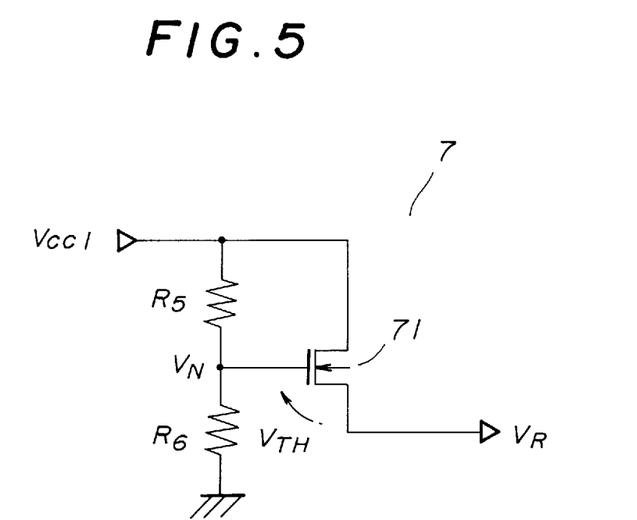
FIG. 5 is a circuit diagram of a voltage step-down circuit used in a regulator circuit according to a second embodiment of the present invention.

FIG. 5 is a circuit diagram of another configuration of the voltage step-down circuit 7 according to a second embodiment of the present invention. The configuration shown in FIG. 5 has less variation in the step-down voltage $V_R$ than that in the step-down voltage $V_R$ generated by the voltage step-down circuit 7 shown in FIG. 4. As has been described previously, the step-down voltage $V_R$ may be slightly varied if the load to which the step-down voltage $V_R$ is applied is varied. If such a very small variation in the step-down voltage $V_R$ is not negligible, the configuration shown in FIG. 5 can be employed. The configuration shown in FIG. 5 is also advantageous if the reference voltage Vref generated by the reference voltage generating circuit 4 is used as a reference voltage of an internal circuit required to have a high precision.

The voltage step-down circuit shown in FIG. 5 includes an MOS transistor 71 connected, in a source-follower formation (in other words, a voltage-follower formation), between the external power supply voltage Vcc1 and the step-down voltage $V_R$. A series circuit composed of resistors R5 and R6 is connected between the external power supply voltage Vcc1 and the ground. A connection node at which the resistors R5 and R6 are connected in series is connected to the gate of the MOS transistor 71. A voltage $V_N$ obtained at the above connection node is applied to the gate of the MOS transistor 71.

With the above structure, the step-down voltage $V_R$ can be always maintained at a level equal to $V_N-V_{TH}$ irrespective of the magnitude of the drain current flowing in the MOS transistor 71, where $V_{TH}$ denotes the threshold voltage of the MOS transistor 71. Hence, the step-down voltage $V_R$ is varied little even if the load to which the step-down voltage $V_R$ should be applied is varied and thus an increased load current flows.

According to the second embodiment of the present invention, the step-down voltage $V_R$ does not depend on the load by providing the voltage step-down circuit 7 having the configuration shown in FIG. 5. Hence, the second embodiment of the present invention can be suitably applied to a case where the loads of the circuits 4 and 5 are not negligible or a case where the reference voltage Vref is used as a highly precise reference voltage used in an internal circuit.

Figure 6:
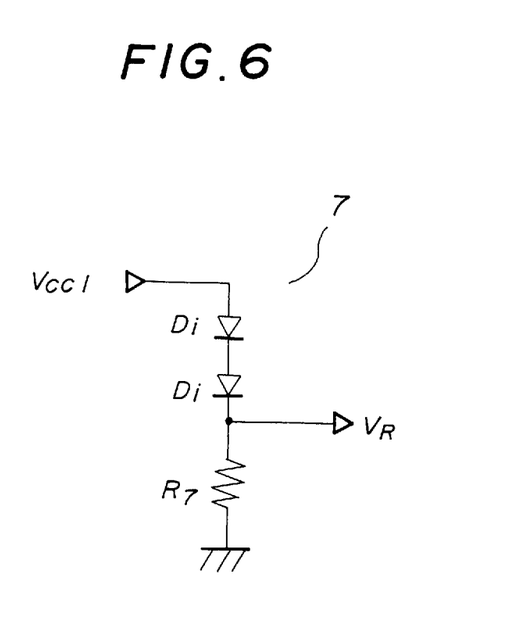
FIG. 6 is a circuit diagram of a voltage step-down circuit used in a regulator circuit according to a third embodiment of the present invention.

FIG. 6 is a circuit diagram of yet another configuration of the voltage step-down circuit 7. The configuration shown in FIG. 6 is also suitable for a case where a variation in the step-down voltage $V_R$ due to a variation in the load is not negligible.

The configuration shown in FIG. 6 includes a series circuit connected between the external power supply voltage Vcc1 and the ground. The above series circuit is made up of a plurality of diodes Di connected in series in the forward direction, and a resistor R7. Each of the diodes Di functions as a level shift element. The step-down voltage $V_R$ is obtained at a node at which one end of the resistor R7 and the cathode of one of the diodes Di are connected. When n diodes Di are connected where n is an integer, the step-down voltage $V_R$ is equal to $Vcc1-n \cdot V_F$ where $V_F$ denotes the forward voltage drop of one diode.

The diodes Di have a non-linear current-voltage response in the forward direction. Hence, the forward voltage drop $V_F$ is not changed greatly even if the current flows therein in the forward direction. Hence, even if the load to which the step-down voltage $V_R$ is applied is varied so that the load current is increased, the forward voltage drops of the diodes Di are not changed greatly. Consequently, the step-down voltage $V_R$ is not varied greatly.

According to the third embodiment of the present invention, the step-down voltage $V_R$ does not depend on the load by providing the voltage step-down circuit 7 having the configuration shown in FIG. 6. Hence, the third embodiment of the present invention can be suitably applied to a case where the loads of the circuits 4 and 5 are not negligible or a case where the reference voltage Vref is used as a highly precise reference voltage used in an internal circuit.

Figure 7:
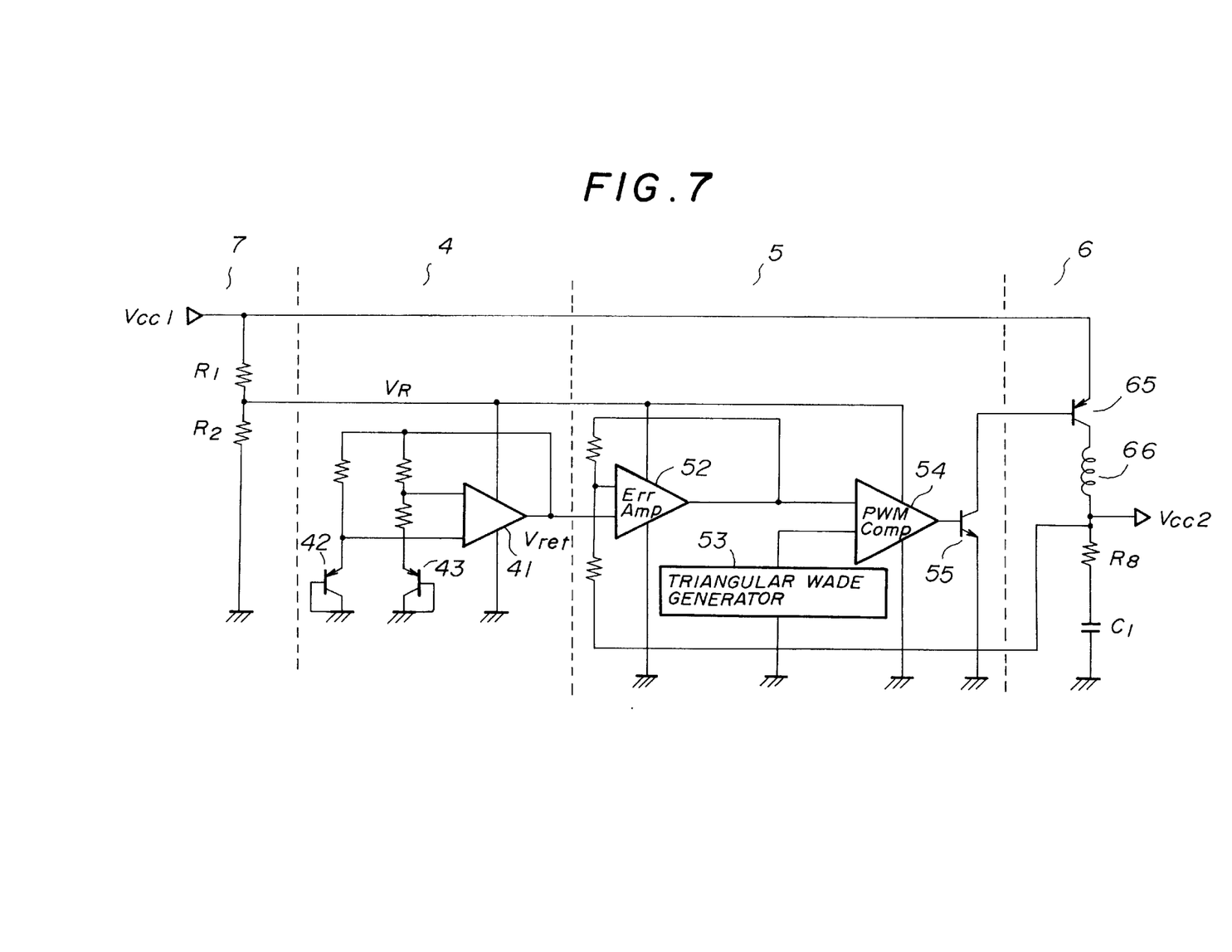
FIG. 7 is a circuit diagram of a regulator circuit according to a fourth embodiment of the present invention.

FIG. 7 is a circuit diagram of a regulator circuit according to a fourth embodiment of the present invention. In FIG. 7, parts that are the same as those shown in the previously described figures are given the same reference numbers. The output voltage control circuit 5 and the output circuit 6 shown in FIG. 7 have respective configurations different from those shown in FIG. 4.

The output voltage control circuit 5 shown in FIG. 7 includes two operational amplifiers 52 and 54, a triangular wave generator 53, and a transistor 55. The operational amplifier 52 detects a difference between the reference voltage Vref and a voltage dependent on the internal power supply voltage Vcc2. The operational amplifier 54 compares a triangular wave generated by the generator 53 with the output signal of the operational amplifier 52. The output signal of the operational amplifier 54 has a signal having a pulse duration depending on the degree of the error output by the operational amplifier 52, and is applied to the base of the transistor 55.

The output circuit 6 includes a transistor 65, a choke coil 66, a resistor R8 and a capacitor C1, these elements being connected in series between the external power supply voltage Vcc1 and the ground. The internal power supply voltage Vcc2 is obtained at a node at which the choke coil 66 and the resistor R8 are connected in series. The choke coil 66 prevents an alternating component from passing therethrough, and the capacitor C1 allows an alternative component to pass therethrough. The transistor 65 is turned ON and OFF by the transistor 55 of the output voltage control circuit 5, and hence the internal power supply voltage Vcc2 can be regulated at a given constant level.

The reference voltage generating circuit 4 and the voltage step-down circuit 7 are the same as those shown in FIG. 4.

According to the fourth embodiment of the present invention, by providing the voltage step-down circuit 7 having a simple structure of the resistors R1 and R2, it is possible to form the circuits 4 and 5 by elements having a reduced size and a reduced breakdown voltage and to reduce the corresponding area occupied on the chip and/or reduce the chip size.

Figure 8:
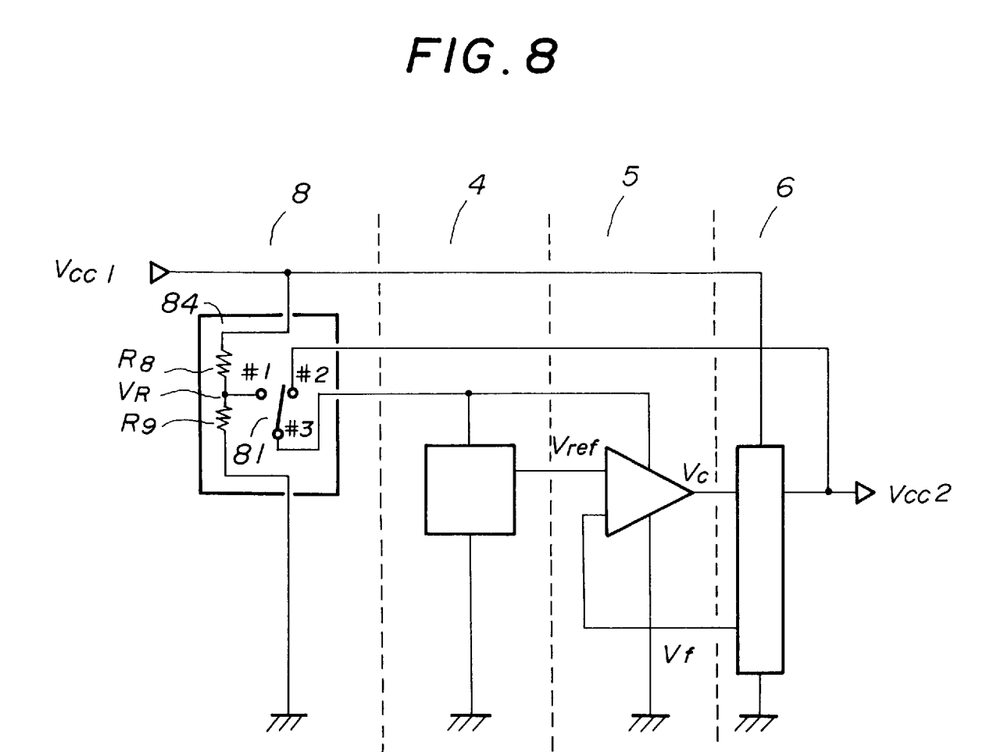
FIG. 8 is a circuit diagram of a regulator circuit according to a fifth embodiment of the present invention.

A description will be given, with reference to FIG. 8, of a regulator circuit according to a fifth embodiment of the present invention. In FIG. 8, parts that are the same as those shown in the previously described figures are given the same reference numbers. The fifth embodiment of the present invention employs a starter circuit 8 instead of the voltage step-down circuit 7 used in the first through fourth embodiments of the present invention. The fifth embodiment of the present invention is immune to a variation in the external power supply voltage Vcc1 and is suitably applied to a situation in which a variation in the external power supply voltage Vcc1 is not negligible.

The starter circuit 8 includes resistors R8 and R9 connected in series between the external power supply voltage Vcc1 and the ground. A switch 81 is provided having stationary contacts #1 and #2, and a movable contact #3. The stationary contact #1 is connected to a node at which the resistors R8 and R9 are connected in series. The step-down voltage $V_R$ is obtained at the above node. The stationary contact #2 is connected to the output terminal of the output circuit 6. The movable contact #3 is connected to the power supply terminals of the reference voltage generating circuit 4 and the output voltage control circuit 5. The resistors R8 and R9, and the switch 81 form a voltage step-down circuit 84.

When a supply of the external power supply voltage Vcc1 is started, the movable contact #3 is connected to the stationary contact #1. Hence, the step-down voltage $V_R$ is supplied to the reference voltage generating circuit 4 and the output voltage control circuit 5. Then, the circuits 4 and 5 start to operate, and the output circuit supplied with the external power supply voltage Vcc1 starts to output the internal power supply voltage Vcc2. When the internal power supply voltage Vcc2 is settled at a given level, the movable contact #3 makes a connection with the stationary contact #2. Hence, the circuits 4 and 5 are driven by the internal power supply voltage Vcc2. Since the internal power supply voltage Vcc2 is stabilized, the circuits 4 and 5 are not affected by a variation in the external power supply voltage Vcc1. Hence, the control signal Vc output by the output voltage control circuit 5 is stabilized, and thus the internal power supply voltage Vcc2 is stabilized.

Figure 9:
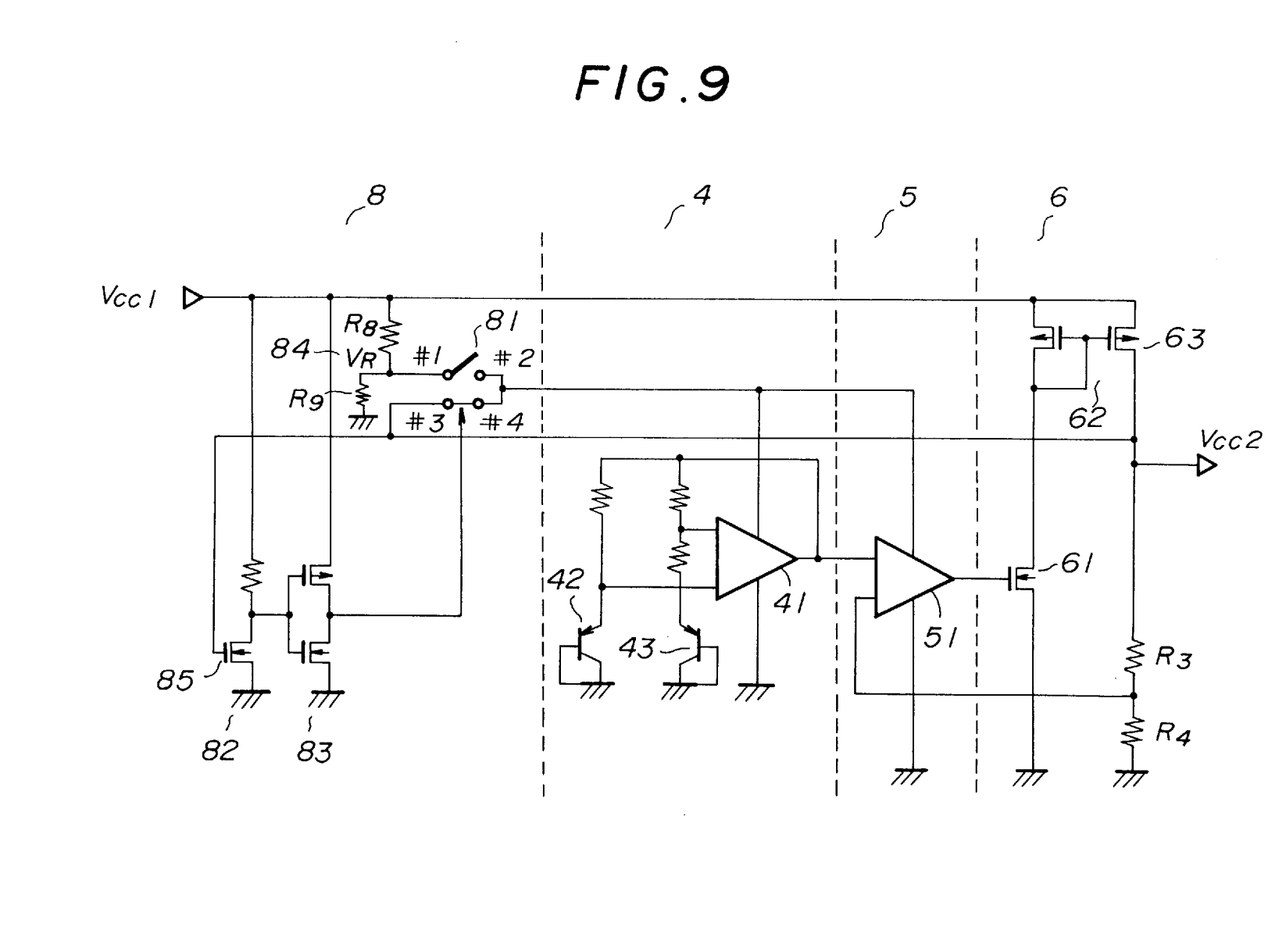
FIG. 9 is a circuit diagram of a variation of the regulator circuit shown in FIG. 8.

FIG. 9 is a circuit diagram of a variation of the circuit shown in FIG. 8 so that a mechanism for controlling the switch 81 shown in FIG. 8 is added to the circuit configuration shown in FIG. 8. In FIG. 9, parts that are the same as those shown in the previously described figures are given the same reference numbers.

The starter circuit 8 shown in FIG. 9 includes, in addition to the step-down circuit 84, a control part 82 including a MOS transistor 85, and a CMOS inverter 83 composed of a P-channel MOS transistor and an N-channel MOS transistor.

Immediately after a supply of the external power supply voltage Vcc1 is started, the internal power supply voltage Vcc2 is not yet increased. Hence, the MOS transistor 85 having a gate receiving the internal power supply voltage Vcc2 is OFF. Hence, the input terminal of the CMOS inverter 83 is at a high level, and the output terminal thereof is at a low level.

The switch 81 shown in FIG. 9 is illustrated so that it has two movable contacts #1 and #3, and two stationary contacts #2 and #4 connected together. When the output signal of the CMOS inverter 83 is low, the switch 81 makes a connection between contacts #1 and #2 and breaks a connection between contacts #3 and #4. Hence, the step-down voltage $V_R$ is applied to the circuits 4 and 5, which start to operate. Thereafter, the internal power supply voltage Vcc2 rises. Then, the MOS transistor 85 is turned ON by the internal power supply voltage Vcc2. Hence, the input potential of the CMOS inverter 83 is switched to the low level, and thus the output potential thereof is switched to the high level. When the output signal of the CMOS inverter 83 is high, the switch makes the connection between the contacts #3 and #4 and breaks the connection between the contacts #1 and #2. Hence, the internal power supply voltage Vcc2 is applied to the circuits 4 and 5, which continue to operate stably.

The resistors R8 and R9 can be replaced by another voltage step-down circuit. For example, the configuration shown in FIG. 5 or FIG. 6 can be employed. In this case, the advantages of the configuration shown in FIG. 5 or FIG. 6 can be additionally obtained.

The present invention is not limited to the specifically disclosed embodiments, and variations and modifications may be made without departing from the scope of the present invention.

What is claimed is:

1. A regulator circuit comprising:
   an output circuit outputting an output voltage based on a control voltage;
   a reference voltage generating circuit generating a reference voltage;
   an output voltage control circuit comparing the reference voltage with a voltage depending on the output voltage and producing the control voltage based on a comparison result; and
   a power supply circuit which supplies the reference voltage generating circuit and the output voltage control circuit with a first power supply voltage which is different from a second power supply voltage supplied to the output circuit.

2. The regulator circuit as claimed in claim 1, wherein the first power supply voltage is lower than the second power supply voltage.

3. The regulator circuit as claimed in claim 1, wherein the power supply circuit comprises a voltage step-down circuit which steps down the second power supply voltage and thus generates the first power supply voltage.

4. The regulator circuit as claimed in claim 1, wherein:
   the power supply circuit comprises a voltage step-down circuit which steps down the second power supply voltage and thus generates the first power supply voltage; and
   the voltage step-down circuit comprises a voltage dividing circuit which divides the second power supply voltage to thereby generate the first power supply voltage.

5. The regulator circuit as claimed in claim 4, wherein the voltage dividing circuit comprises resistors connected in series between the second power supply voltage and a given node.

6. The regulator circuit as claimed in claim 1, wherein:
   the power supply circuit comprises a voltage step-down circuit which steps down the second power supply voltage and thus generates the first power supply voltage; and
   the voltage step-down circuit comprises a transistor connected in a source-follower formation, and has a drain receiving the second power supply voltage, a gate receiving a given voltage lower than the second power supply voltage, and a source via which the first power supply voltage is output.

7. The regulator circuit as claimed in claim 1, wherein:
   the power supply circuit comprises a voltage step-down circuit which steps down the second power supply voltage and thus generates the first power supply voltage; and
   the voltage step-down circuit comprises at least one diode provided between the second power supply voltage and a given node having a potential lower than the second power supply voltage, the first power supply voltage corresponding to a level shifted voltage generated by said at least one diode.

8. The regulator circuit as claimed in claim 1, wherein the power supply circuit comprises:
   a voltage step-down circuit which steps down the second power supply voltage and thus generates the first power supply voltage; and
   a switch circuit which selects one of the first power supply voltage generated by the voltage step-down circuit and the output voltage output by the output circuit.

9. The regulator circuit as claimed in claim 8, wherein the power supply circuit comprises a control circuit which controls the switch circuit on the basis of the output voltage output by the output circuit.

10. The regulator circuit as claimed in claim 8, wherein the switch circuit selects the first power supply voltage when the second power supply voltage starts being externally supplied, and selects the output voltage when the output voltage is settled.

11. The regulator circuit as claimed in claim 9, wherein the control circuit comprises a transistor having a gate receiving the output voltage, a first terminal coupled to the second power supply voltage, and a second terminal coupled to a given potential,
   a voltage of the first terminal of the transistor being used to control the switch circuit.

12. The regulator circuit as claimed in claim 11, wherein the control circuit comprises an inverter circuit which inverts the voltage of the first terminal of the transistor, an inverted voltage being applied to the switch circuit in order to control the switch circuit.

13. A semiconductor integrated circuit device comprising:
   a chip;
   a voltage regulator disposed on said chip; and
   an internal circuit supplied with voltage output from the voltage regulator,
   said voltage regulator comprising:
      an output circuit outputting said output voltage based on a control voltage;
      a reference voltage generating circuit generating a reference voltage;
      an output voltage control circuit comparing the reference voltage with a voltage depending on the output voltage and producing the control voltage based on a comparison result; and
      a power supply circuit which supplies the reference voltage generating circuit and the output voltage control circuit with a first power supply voltage which is different from a second power supply voltage supplied to the output circuit.

14. The semiconductor integrated circuit device as claimed in claim 13, wherein the first power supply voltage is lower than the second power supply voltage.

15. The semiconductor integrated circuit device as claimed in claim 13, wherein the power supply circuit comprises a voltage step-down circuit which steps down the second power supply voltage and thus generates the first power supply voltage.

16. The semiconductor integrated circuit device as claimed in claim 13, wherein:
   the power supply circuit comprises a voltage step-down circuit which steps down the second power supply voltage and thus generates the first power supply voltage; and
   the voltage step-down circuit comprises a voltage dividing circuit which divides the second power supply voltage to thereby generate the first power supply voltage.

17. The semiconductor integrated circuit device as claimed in claim 16, wherein the voltage dividing circuit comprises resistors connected in series between the second power supply voltage and a given node.

18. The semiconductor integrated circuit device as claimed in claim 13, wherein:
   the power supply circuit comprises a voltage step-down circuit which steps down the second power supply voltage and thus generates the first power supply voltage; and
   the voltage step-down circuit comprises a transistor connected in a source-follower formation, and has a drain receiving the second power supply voltage, a gate receiving a given voltage lower than the second power supply voltage, and a source via which the first power supply voltage is output.

19. The semiconductor integrated circuit device as claimed in claim 13, wherein:
   the power supply circuit comprises a voltage step-down circuit which steps down the second power supply voltage and thus generates the first power supply voltage; and
   the voltage step-down circuit comprises at least one diode provided between the second power supply voltage and a given node having a potential lower than the second power supply voltage, the first power supply voltage corresponding to a level shifted voltage generated by said at least one diode.

20. The semiconductor integrated circuit device as claimed in claim 13, wherein the power supply circuit comprises:
   a voltage step-down circuit which steps down the second power supply voltage and thus generates the first power supply voltage; and
   a switch circuit which selects one of the first power supply voltage generated by the voltage step-down circuit and the output voltage output by the output circuit.

21. The semiconductor integrated circuit device as claimed in claim 20, wherein the power supply circuit comprises a control circuit which controls the switch circuit on the basis of the output voltage output by the output circuit.

22. The semiconductor integrated circuit device as claimed in claim 20, wherein the switch circuit selects the first power supply voltage when the second power supply voltage starts being externally supplied, and selects the output voltage when the output voltage is settled.

23. The semiconductor integrated circuit device as claimed in claim 21, wherein the control circuit comprises a transistor having a gate receiving the output voltage, a first terminal coupled to the second power supply voltage, and a second terminal coupled to a given potential,
   a voltage of the first terminal of the transistor being used to control the switch circuit.

24. The semiconductor integrated circuit device as claimed in claim 23, wherein the control circuit comprises an inverter circuit which inverts the voltage of the first terminal of the transistor, an inverted voltage being applied to the switch circuit in order to control the switch circuit.

* * * * *